US010601981B1

(12) United States Patent
Camps et al.

(10) Patent No.: US 10,601,981 B1
(45) Date of Patent: Mar. 24, 2020

(54) APPARATUS AND METHOD FOR INTRINSICALLY SAFE OPERATION OF A PORTABLE COMMUNICATION DEVICE (71) Applicant: MOTOROLA SOLUTIONS, INC, Chicago, IL (US)

(72) Inventors: Carlos Camps, Fort Lauderdale, FL (US); Javier Alfaro, Miami, FL (US); Andres I Lacambra, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/227,017

(22) Filed: Dec. 20, 2018

(51) Int. Cl.
H04M 1/73 (2006.01)

(52) U.S. Cl.
CPC .................. H04M 1/73 (2013.01)

(58) Field of Classification Search
CPC ................ H04M 1/18; H04M 1/73
See application file for complete search history.

(56) References Cited

U.S. PATENT DOCUMENTS

| 6,789,205 B1 | 9/2004 | Patino et al. | |
| 7,130,665 B2 | 10/2006 | Pinder | |
| 8,805,455 B2 | 8/2014 | Bohne | |
| 2001/0023538 A1* | 9/2001 | Muraguchi | B26B 19/02 30/43.92 |
| 2004/0043799 A1* | 3/2004 | Ishibashi | H04M 1/0214 455/575.1 |
| 2005/0049010 A1* | 3/2005 | Pinder | H04M 1/18 455/572 |
| 2013/0078909 A1* | 3/2013 | Smith | H04B 7/155 455/11.1 |
| 2016/0248241 A1 | 8/2016 | Kancel | |
| 2017/0142840 A1 | 5/2017 | Surinya | |

* cited by examiner

Primary Examiner — Hsinchun Liao
(74) Attorney, Agent, or Firm — Barbara R. Doutre (57) ABSTRACT A portable communication device is provided with a power arbitration module formed with hardware logic configured to detect attachment of a battery and determine whether the battery is one of: an intrinsically safe (IS) battery or a standard, non-intrinsically safe (non-IS) battery. The power arbitration module enables a converged platform mode of operation in response to determining that the battery is a standard, non-intrinsically safe battery. The power arbitration module enables a land mobile radio (LMR) mode of operation in response to determining that the battery is an intrinsically safe battery. The determination of the battery type and enablement of operating mode is handled by hardware logic of the power arbitration module without use of a software protocol.

18 Claims, 6 Drawing Sheets

APPARATUS AND METHOD FOR INTRINSICALLY SAFE OPERATION OF A PORTABLE COMMUNICATION DEVICE

FIELD OF THE INVENTION

The present invention relates generally to portable communication devices, and more particularly to the intrinsically safe operation of such devices and converged mode operation of such devices.

BACKGROUND

Portable battery-powered radio communication devices are advantageous in many environments, but particularly in public safety environments such as fire rescue, first responder, and mission critical environments. When operating in such environments, the device may be exposed to gases, fumes, and dust that have the potential for creating an explosive atmosphere. Portable communication devices intended for use in potentially explosive atmospheres should be designed to meet the safety standards of Directive 94/9/EC of the European Parliament and the Council of the European Union, commonly referred to as ATEX, which is derived from the French words ATmospheres EXplosibles. A portable communication device that meets the ATEX standards may be referred to as having an "intrinsically safe" rating. A portable communication device that has an intrinsically-safe rating is less likely to ignite an explosive atmosphere while operating within such an environment.

There is a desire to incorporate advanced processing and broadband communication circuitry into portable battery-operated communication devices to provide converged functionality. For example, there is a desire to provide converged land mobile radio (LMR) and long term evolution (LTE) platforms into a portable battery operated communication device. However, designing a device for converged platforms presents challenges with increased capacitance and higher voltage supplies which may exceed intrinsic safety limits. It is also important to be mindful of space and weight constraints.

Accordingly, there is a need for an improved portable communication device for intrinsically safe operation.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein a portable communication device that provides a failsafe mode of operation that disables non-compliant circuitry of converged device operation and allows for intrinsically safe land mobile radio (LMR) operation. The portable communication device comprises a power arbitration formed of hardware logic configured to detect battery attachment and determine whether the battery is one of a standard, non-intrinsically safe (non-IS) battery or an intrinsically safe (IS) battery. A standard, non-intrinsically safe mode of operation is enabled based on attachment of the standard non-intrinsically safe battery, and an intrinsically safe mode of operation is enabled based on attachment of the intrinsically safe battery. Converged platforms of both LMR and non-LMR functions are enabled during standard, non-intrinsically safe operation, and a land mobile radio (LMR) platform is enabled during the intrinsically safe operation.

FIGS. 1A, 1B, 1C, and 1D are block diagrams for a portable communication device, such as a portable public safety communication device, in accordance with some embodiments. The portable communication device 100 may be powered by one of two interchangeable batteries 102, 104, one of which is a standard non-intrinsically safe battery and the other being an intrinsically safe battery as will be described in terms of FIGS. 1A, 1B, 1C, and 1D. The portable communication device 100 may also be powered by one battery 150 providing voltage rails, one voltage rail for standard non-intrinsically safe operation and the other voltage rails being for intrinsically safe operation as will be described in terms of FIG. 1D. Overall operation applicable to all embodiments will be described first followed by specifics to each figure.

For In accordance with the embodiments, and as applied across all FIGS. 1A, 1B, 1C, and 1D, the portable communication device 100 comprises a power arbitration module 106 configured via hardware logic to detect attachment of a battery and to further determine whether the battery is one of: an intrinsically safe (IS) battery or a standard, non-intrinsically safe (non-IS) battery. The power arbitration is based on attachment of an intrinsically safe (IS) battery or a standard, non-intrinsically safe (non-IS) battery. In accordance with further embodiments, the power arbitration module 106 enables a converged platform mode of operation in response to determining that the attached battery is a standard, non-intrinsically safe battery. The converged platform mode of operation is provided by a land mobile radio (LMR) system 108 and an applications system 110. In accordance with further embodiments, the hardware logic of power arbitration module 106 further enables the LMR mode of operation while disabling the applications system 110, in response to determining that the battery is an intrinsically safe battery.

In accordance, with the embodiments, the hardware logic of power arbitration module 106 advantageously detects the battery attachment and further provides for a determination of the battery type as being an IS battery or a non-IS battery without the use of a software protocol, thereby avoiding power up issues that could be associated with non-compliant circuitry.

The hardware logic of power arbitration module 106 may be embodied as a state machine of pre-programmed hardware logic. Various preprogrammed state machine configurations may be implemented for receiving voltage inputs in response to attachment of a battery and will not be described in detail. The power arbitration module 106 of the embodiments provided herein not only detects battery attachment and determination of an IS battery versus a non-IS battery but further controls placing the device into an IS or non-IS mode of operation by managing the power control to converged and non-converged systems. The power control management beneficially allows different operating systems (regardless of high capacitance) to reside on one device. Voltage inputs which can be used by the hardware logic to manage arbitration of power may comprise, but are not limited, a voltage state indicating the absence of a near field communication antenna in the IS battery (as shown in FIG. 1A), a voltage state on a battery ID pin (as shown in FIG. 1B), voltage inputs via a physical switch 140 at the device being set in response to attachment of an IS battery (as shown in FIG. 1C), and/or first and second voltage rail inputs (as shown in FIG. 1D).

Figure 1A:
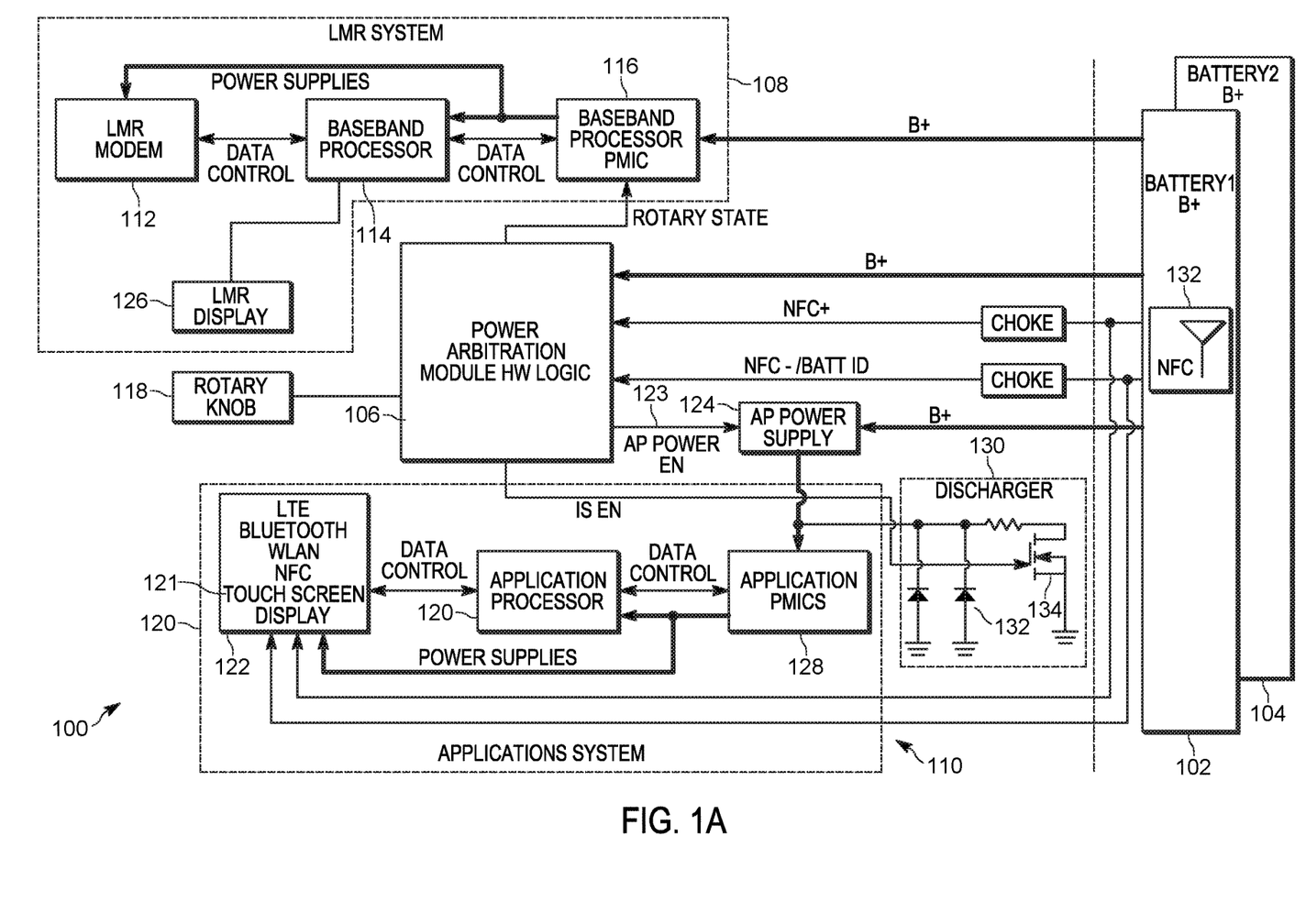
FIGS. 1A, 1B, 1C, and 1D are block diagrams for a portable communication device in accordance with some embodiments.
Figure 1B:
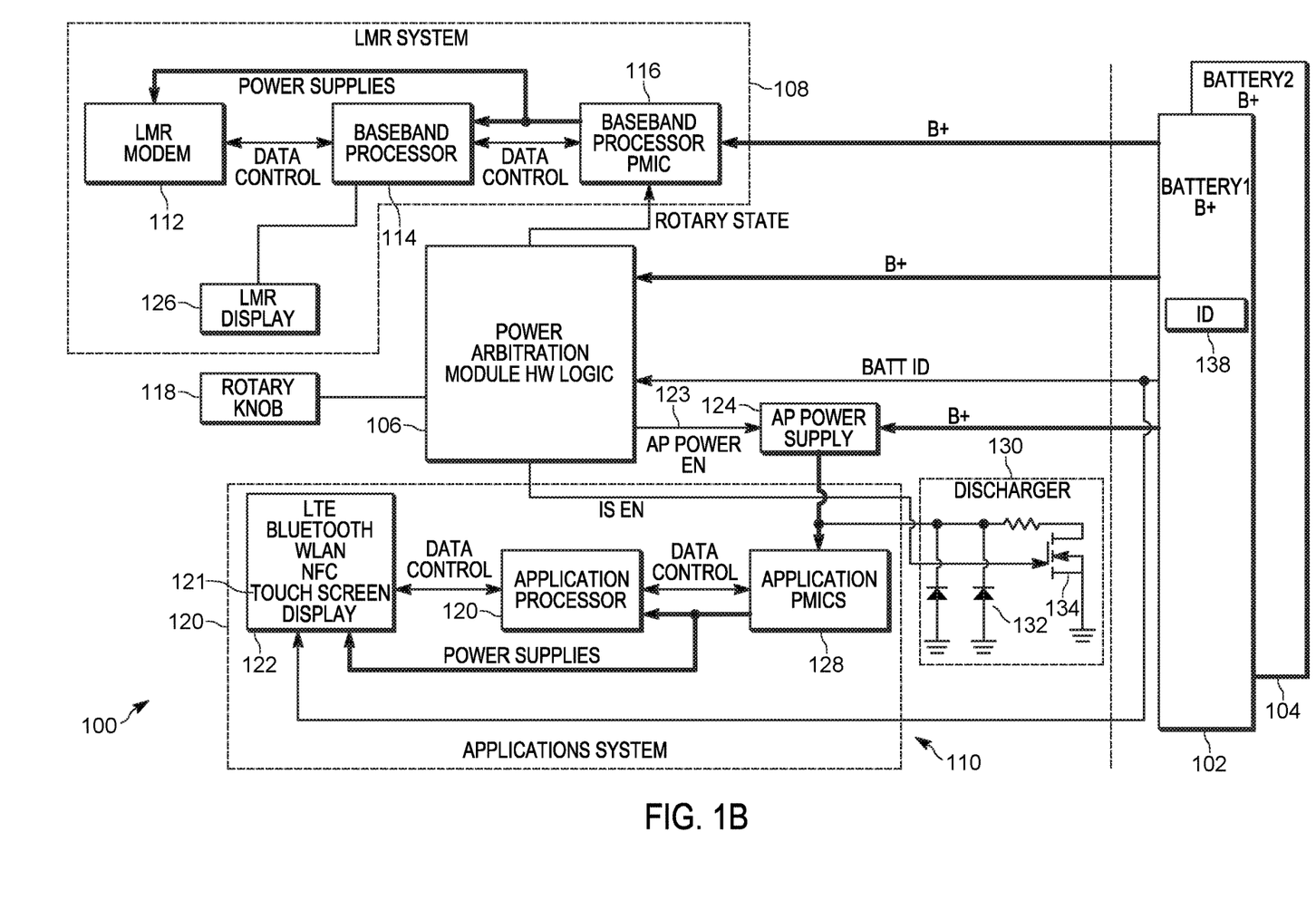
Figure 1C:
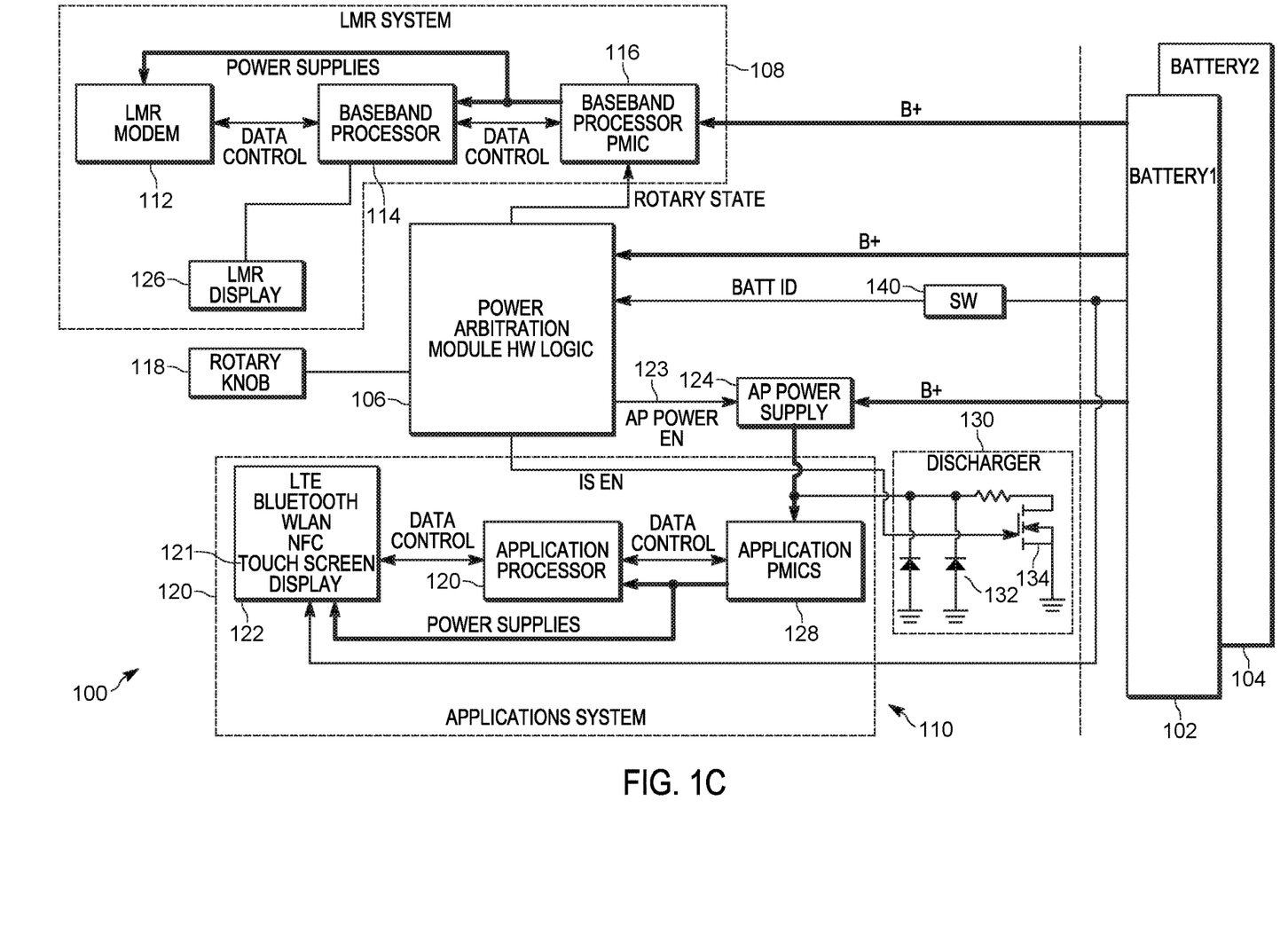
Figure 1D:
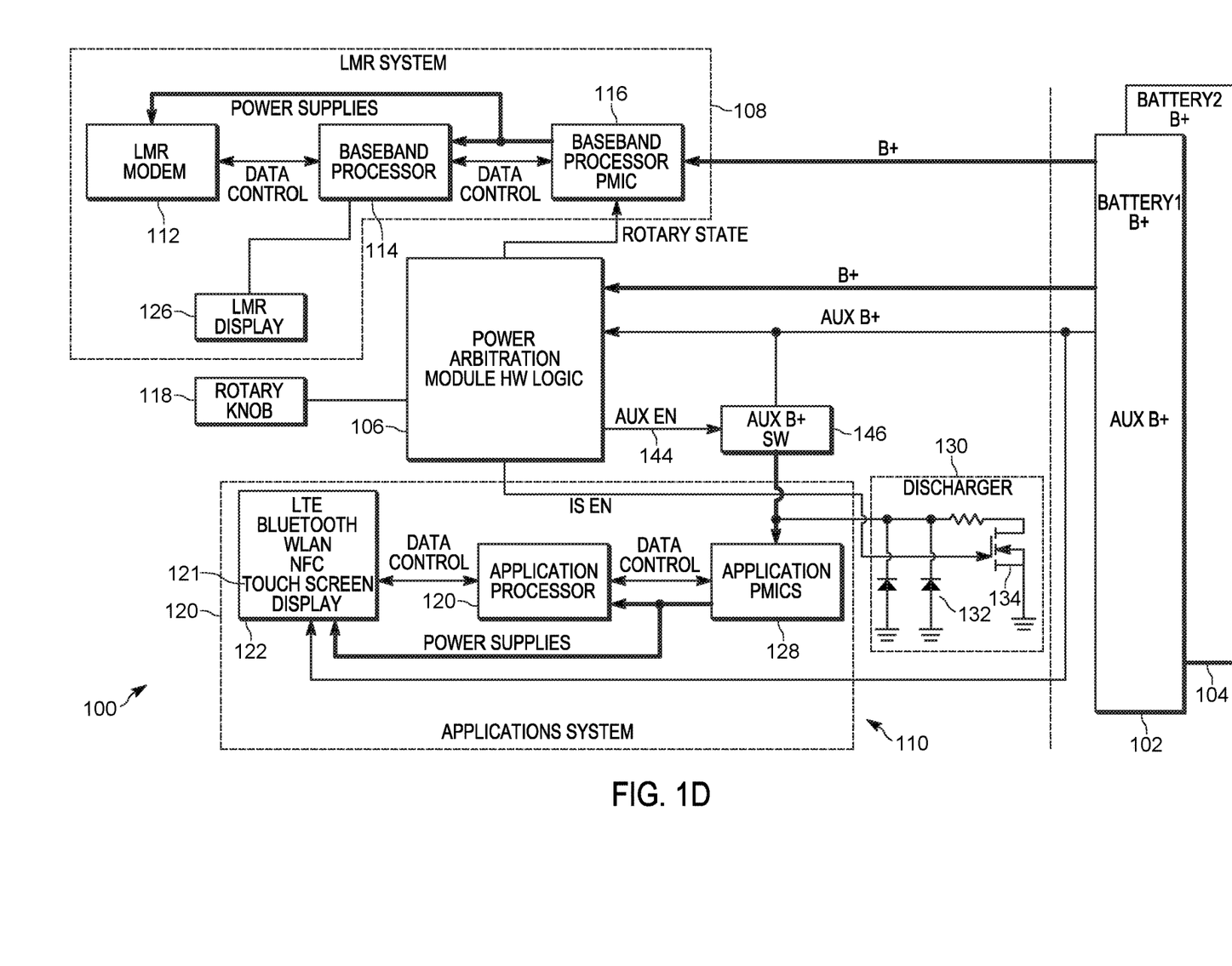

While the operation of the battery attachment detection and determination of battery type (IS battery/non-IS battery) may be enabled by the embodiments of FIGS. 1A, 1B, and/or 1C, it is to be appreciated that the overall power control of the device 100, handled by modulation module 106, advantageously powers and removes power to the converged and non-converged systems based on detection of attachment of the battery and determination of battery type (IS battery/non-IS battery).

The LMR system 108 comprises an LMR modem 112, a baseband processor 114, an LMR display 126, and a baseband processor power management module 116 with data control signals running therebetween. The LMR system 108 is powered by a battery (B+) which is enabled by an input from an on-off control to the radio, such as by a rotary knob 118. Hardware logic in power arbitration module 106 is powered as soon as a battery is attached. Regardless of the state of the control knob 118, the power arbitration module 106 will proceed with the detection of the type of battery. Turning on the LMR and application systems will then proceed depending on the state of the rotary knob and the type of battery that has been attached.

Power to the applications system 110 is controlled by enabling or disabling a dedicated applications power supply 124. The applications system 110 comprises an applications power management integrated circuit 128 for powering an applications processor 120 and selectively powering one or more of a plurality of auxiliary functions 122. The hardware logic of power arbitration module 106 enables or disables the applications power supply 124 to the applications system 110 in response to the type of battery (IS or non-IS) being attached to the portable communication device 100. The plurality of auxiliary functions 122 may be provided by one or more auxiliary modems, such as a long term evolution (LTE) modem, BLUETOOTH modem, wireless local area network (WLAN) modem, and near field communications (NFC) modem, and touch screen display.

In accordance with the embodiments, the converged platform mode of operation is provided by the land mobile radio modem 112 and at least one of the plurality of auxiliary functions 122, such as operated by long term evolution (LTE) modem, BLUETOOTH modem, wireless local area network (WLAN) modem, and near field communications (NFC) modem, and touch screen display 121.

The portable communication device further comprises discharge circuitry 130 that discharges residual power at the applications power supply 124 upon attachment of an intrinsically safe (IS) battery to the portable communication device 100. The discharge circuitry 130 may be implemented with discrete components of resistor, diodes 132 and a field effect transistor (FET) 134, or other discrete component configuration.

The portable communication device further comprises a first display 121 and a second display 126. The first display 121 is considered a function of the applications system 110 and is provided as a touch screen display for application processes. The second display is an LMR display for displaying LMR information, such as volume level, channel, and zone. In accordance with the embodiments, both the first and second displays 121, 126 are operational during the non-IS mode of operation, and only the LMR display 126 is operational during the IS mode of operation.

In operation, upon attachment of a battery, a battery voltage (B+) is applied to both the power arbitration module 106 and LMR system 108. An applications power enable/disable output 123 of power arbitration module 106 is off by default. The type of battery is detected by hardware logic of power arbitration module 106.

An example of the non-intrinsic battery 102 containing a near field antenna 132, referred to as an NFC battery, is described next in conjunction with FIG. 1A. Chokes can be coupled to signals (NFC+, NFC−) of the power arbitration module 106 and used to provide detection of the NFC battery by providing an open to RF but acting as a short to DC. The standard, non-IS battery will be detected by the NFC− input voltage to the hardware logic of power arbitration module 106 as being substantially the same as the NFC+ voltage, thereby indicating a battery intended for a converged platform. The hardware logic of power arbitration module 106 then proceeds to power up both the LMR system 108 and the applications system 110. Powering of the LMR system is achieved using the battery voltage input (B+) which is enabled via the rotary state (on) of rotary control 118. The hardware logic of power arbitration module 106 disables the discharge circuit 130 and then enables the applications power supply 124 which powers the applications power management IC 128. The applications processor 120 then operates as configured to control one or more of the auxiliary functions 122.

When attaching an intrinsic battery 104, the voltage output (NFC+) of the power arbitration module 106 will be presented to the NFC+ terminal of the IS battery 104 and the second voltage input (NFC−) will be read providing the detection of the battery. The absence of the NFC antenna at battery 104 will result in the second voltage input (NFC−) to power arbitration module 106 being open, thereby enabling the intrinsically safe mode of operation, wherein the LMR system is powered by the battery (by B+ and rotary state being on), while the applications power supply 124 is not enabled. The IS operating mode further provides for discharge of residual voltage of the AP power supply 124 by discharge circuit 130.

In both IS and non-IS modes of operation, after battery detection is complete, the hardware logic of the power arbitration module 106 configures the NFC+ and NFC− signal ports as high impedance, which prevents loading down the NFC antenna during non-IS mode of operation.

FIG. 1B shows a detection approach implemented by utilizing a battery ID pin 138 in accordance with some embodiments. Like the NFC approach, the power arbitration module 106 can detect intrinsic and non-intrinsic batteries based on an expected predetermined voltage for the battery ID. By applying a battery ID voltage input to the hardware logic of the power arbitration module 106, the power arbitration module then enables or disables the AP power supply 124 for powering the applications system 110. Upon the detection of an intrinsically safe battery, the discharge circuit 130 is enabled by the hardware logic in the power arbitration module 106, as previously described.

The detection approach can also be implemented via a mechanical switch 140, on the device side, as shown in FIG. 1C. The mechanical switch 140 can be asserted by the physical attachment of a battery. The switch 140, when asserted, sets a voltage input to the hardware logic of the power arbitration module 106 to indicate IS or non-IS battery. The state of the switch can be read with the Batt ID input. Alternatively, a user can enable the switch 140 via a "key" feature on the IS battery 104. Regardless of the implementation, the change in the state of the switch 140 is detected by the power arbitration module 106 and is indicative of an IS battery being detected which disables 123 the power arbitration module 106. Upon the detection of an intrinsically safe battery, the discharge circuit 130 is enabled by the hardware logic in the power arbitration module 106, as previously described.

FIG. 1D shows another alternative detection approach implemented by utilizing a standard non-IS battery that incorporates two distinct voltage rails: one voltage rail B+ is allocated for the LMR system 108 and power arbitration module 106, while the second voltage rail, AUX B+, replaces the previous AP system power supply 124. In this approach, the IS battery 104 only includes one voltage rail (B+) allocated for the LMR system 108 and power arbitration module 106. In this approach, the power arbitration module 106 controls an auxiliary B+ enable/disable output 144 to an auxiliary B+ switch (AUX B+SW) 146. When the hardware logic in the power arbitration module 106 detects a valid voltage level (for example ~>3.5V) for AUX B+ upon a battery attachment, a standard non-IS battery is detected. In response to the standard non-IS battery 102 being detected, the AUX B+ switch 146 is enabled, and the AUX B+ voltage is applied to power the applications system 110. Since the intrinsically safe battery does not include an AUX B+ voltage, the hardware logic in the power arbitration module 106 will detect an invalid voltage level for AUX B+ upon attachment of an intrinsically safe battery 104. Upon the detection of an intrinsically safe battery, the discharge circuit 130 is enabled by the hardware logic in the power arbitration module 106.

Accordingly, the portable communication device 100 provides battery detection and battery type determination prior to boot-up of any processor. Software protocols (such as 1-wire, etc.) are intentionally not used for detection to maintain safety and compliance. During operation of the intrinsically safe mode, the application power supply 124 to the non-mission critical, applications system 110 is completely discharged and clamped. The non-mission critical system remains unpowered until the IS battery 104 is removed and a standard, non-IS battery 102 is attached and detected.

Figure 2:
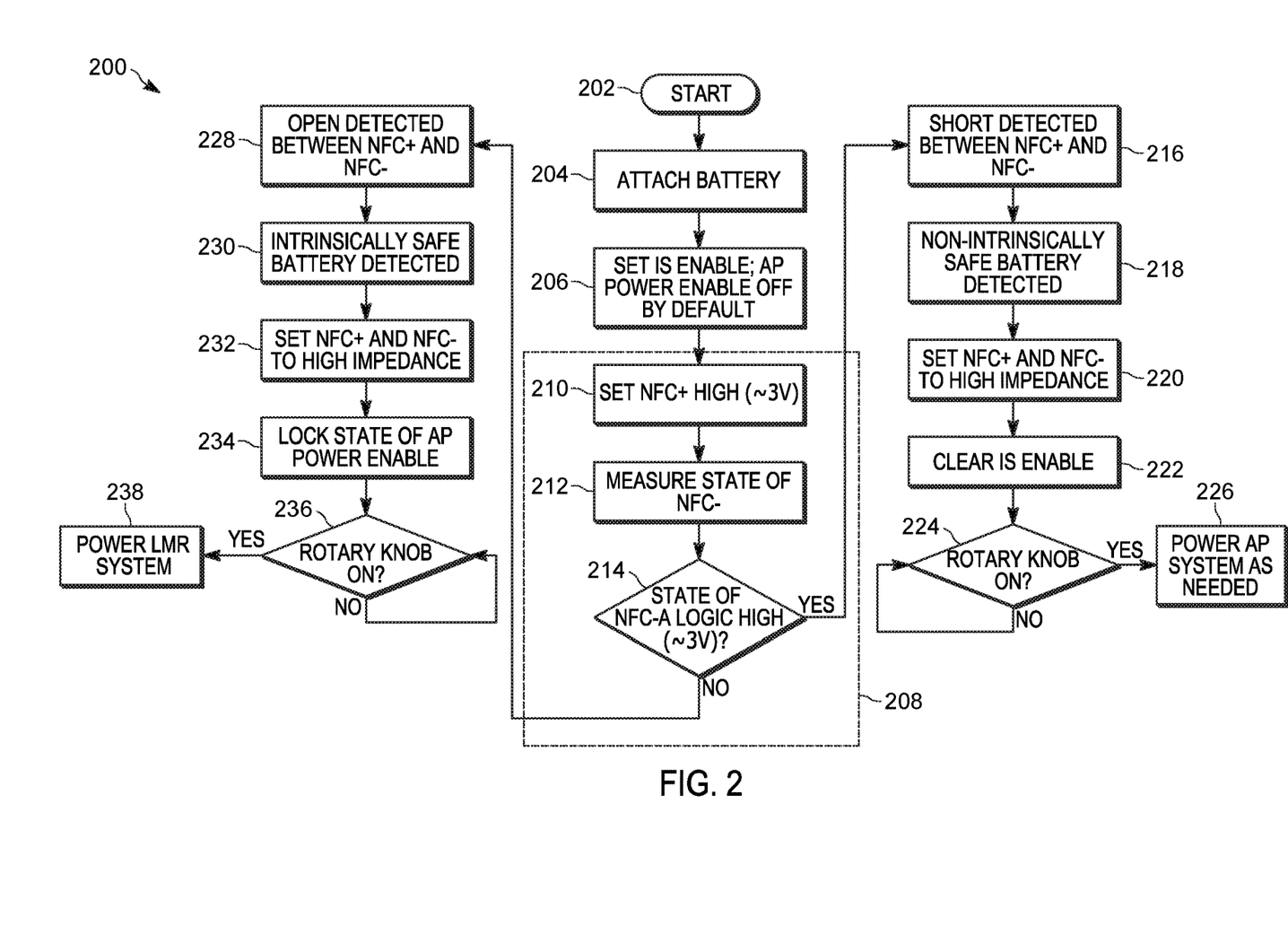
FIG. 2 is a flowchart of a method of operating a portable communication device in accordance with some embodiments.

FIG. 2 is a flowchart of a method 200 of operating the portable communication device of FIG. 1 in accordance with some embodiments. While described in terms of the near field communication antenna embodiment, it is to be appreciated that the method can be applied based on other battery originated voltage inputs to the hardware logic of power arbitration module 106 of FIG. 1 for the management of power control, such as battery ID voltage (FIG. 1B), or a mechanical switch assertion (FIG. C)

The method 200 starts at 202 where a battery is attached to the portable communication device at 204. In response to the battery being attached, the hardware logic of power arbitration module within the radio is set to enable to discharge any residual current of the AP power supply. For example, the hardware logic of power arbitration module within the radio may be set to enable an IS high to discharge any residual current through the FET thereby ensuring that the AP processor is off while the battery determination is being made (IS EN goes high to FET 134 of FIG. 1).

Once battery attachment is detected, determination of battery type (IS or non-IS) takes place at 208. There are different approaches to detecting IS or non-IS battery—all of which are hardware based and negate any powering to the applications or baseband processor. For example, for embodiments utilizing a near field antenna in the non-IS battery, the battery type may be determined by the logic state across two NFC contacts (NFC+, NFC−), where the NFC+ input output going high at 210 (choke provides short to DC and open to RF). At 212 the hardware logic of power arbitration module measures the state of NFC− input. Upon determining the state of NFC− going high (matching the voltage set by NFC+), thereby indicting a short 216 between the two contacts indicates the presence of a non-intrinsically safe battery at 218.

The presence of a non-intrinsically safe battery being detected at 218, causes a high impedance to be set at the NFC ports by the power arbitration module which in turn clears the IS enable line. Clearing the IS enable line at 222 and rotary controlled turned on, enables power to be supplied to the AP processor at 226 thereby powering the AP system and LMR system.

If at 214, the state of NFC logic did not go high, then an open would be detected at 228, thereby indicate the presence of an intrinsically safe battery at 230. The detection of an intrinsically safe battery at 230 results in the hardware logic of power arbitration module setting the NFC+ and NFC− to high impedance and locks out the power enable state of the AP processor. If the rotary knob being is turned on at 236, power will be applied to the LMR system at 238.

While described into terms of an NFC antenna embodiment, the method 200 of operating a portable communication device can be summarized generally as follows, (and as can be applied to all of the embodiments of FIGS. 1A, 1B, 1C, and 1D) beginning by detecting, using hardware logic at the portable communication device, attachment of a battery to the portable communication device, and then determining, using the hardware logic, whether the attached battery is a standard, non-intrinsically safe battery or an intrinsically safe battery. The method further enables, using the hardware logic, power for operating the radio in a standard, non-intrinsically safe mode of operation based on attachment of the standard non-intrinsically safe battery, and the method further enables, using the hardware logic, power for operating the radio in an intrinsically safe mode of operation based on attachment of the intrinsically safe battery.

The enabling of power for operating the portable communication device in a standard, non-intrinsically safe mode further enables converged LMR and non-LMR auxiliary platforms. The enabling of power for operating the portable communication device in an intrinsically safe mode enables operation of the portable communication device using only an LMR platform.

As previously described, the non-LMR auxiliary system comprises at least one of: a long term evolution (LTE), BLUETOOTH, a wireless local area network (WLAN), near field communications (NFC), and a touch screen display. Enabling power for operating the radio in a standard, non-intrinsically safe mode of operation further comprises enabling an auxiliary applications power supply and a land mobile radio (LMR) power supply. Enabling power for operating the radio in the intrinsically safe mode of operation further comprises enabling a land mobile radio (LMR) power supply and discharging any residual power on the auxiliary applications power supply.

In accordance with further embodiments, the method may further enable a first touch screen display and a second non-touch screen display of the portable communication device during standard, non-intrinsically safe mode of operation; and enabling only the second, non-touch screen display during the intrinsically safe mode of operation.

Figure 3:
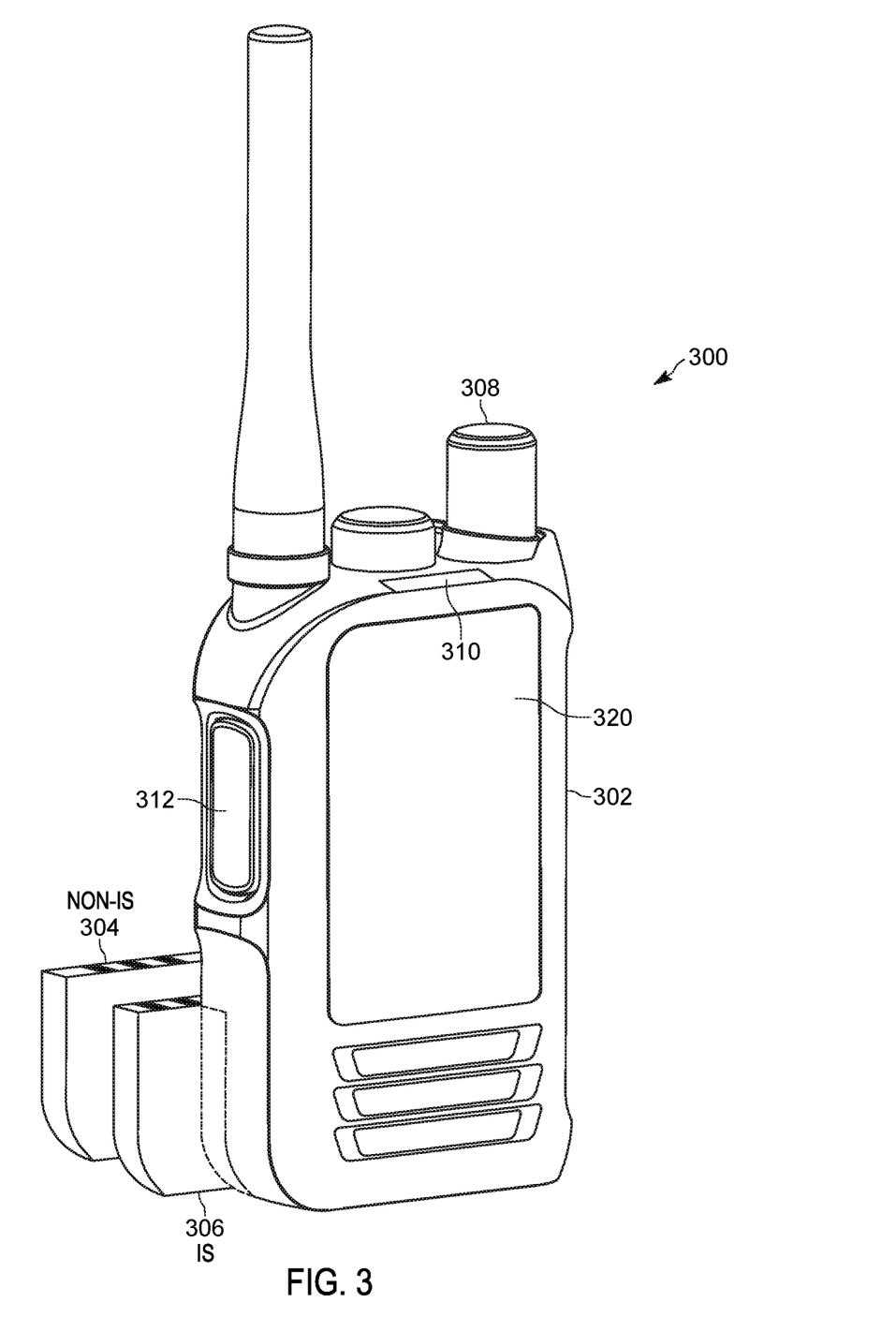
FIG. 3 is a portable communication device formed and operating in accordance with some embodiments.

FIG. 3 is a portable radio communication system 300 formed and operating in accordance with some embodiments. The portable radio communication system 300 comprises a radio housing 302 and circuitry in conjunction with the embodiments of FIGS. 1A, B, C, D. The radio housing 302 interchangeably accepts a standard non-intrinsically safe battery 304 and an intrinsically safe battery 306. Power control knob 308 being turned on enables the power arbitration module to control the application of power for converged (LMR/Apps) operation and non-converged (LMR only) operation. The previously described power arbitration module contained within the radio detects attachment of a battery to the housing and provides power arbitration for a standard, non-intrinsically safe mode of operation based on attachment of the standard non-intrinsically safe (non-IS) battery 304; and an intrinsically safe (IS) mode of operation based on attachment of the intrinsically safe battery 306. As previously stated, hardware logic in power arbitration module 106 of FIGS. 1A. B. C. D is powered as soon as a battery is attached. Regardless of the state of the control knob 308, the power arbitration module will proceed with the detection of the type of battery. Turning on the LMR and applications systems will then proceed depending on the state of the rotary knob 308 and the type of battery that was attached.

In accordance with further embodiments, the hardware logic further enables power to: a converged system in response to determining that the battery is a standard, non-intrinsically safe battery 304; and a land mobile radio (LMR) system in response to determining that the battery is an intrinsically safe battery 306. The standard, non-intrinsically safe mode of operation provides for operation of both a land mobile radio (LMR) system and non-mission critical auxiliary applications (AP) system powered by the non-intrinsically safe battery 304. The non-mission critical auxiliary application (AP) systems comprise at least one of: a long term evolution (LTE), BLUETOOTH, wireless local area network (WLAN), and near field communications (NFC), and a touch screen display. In the intrinsically safe mode of operation the applications system is unpowered until the intrinsically safe battery 306 is removed and a standard, non-intrinsically safe battery 304 is attached.

In accordance with some embodiments, the portable radio communication system 300 further comprises a first display 310 and a second display 320. The first display 310 being a touch screen display for application processes, and the second display 320 for displaying LMR information. Both the first and second displays 310, 320 are operational during the non-IS mode of operation, and only the LMR display 320 is operational during the IS mode of operation.

An example of a use case for portable radio communication system 300 may occur when a user is dispatched to a potential hazardous location zone. The user turns off the portable device via control knob 308. Attachment of battery and determination of the intrinsically safe battery 306 is detected which then disables non-compliant circuitry within the radio, such as circuitry associated with the LTE function, and discharges any accumulated charge. The user then restarts the radio, which will power up in an intrinsically safe mode with full LMR-only (non-converged) functionality. The user can, upon leaving the potential hazardous location zone, change out the battery for the non-IS battery 304 for fully converged communications.

The embodiments provide for a portable communication device that changes its feature set based on operating the device in either an intrinsically safe mode of operation or standard mode of operation. The challenges associated with increased capacitance and higher voltage operation have been addressed without having to isolate or clamp large voltages or current nodes within the device and without having to increase the device's printed circuit board area and without the use of potting compounds which add weight and size to a device. Users having intrinsic safety needs no longer need to forego converged devices, as the device can be operated in LMR mode when in a hazardous environment using the IS battery and quickly switched to a full feature set, by changing to a non-IS battery, when outside of the hazardous environment. The embodiments allow for standardization of a portable public safety communication device across haz-loc and standard environments. A user can now carry one device and two batteries, as opposed to trying to manage separate devices each having its own battery, thereby maintaining consistence and improving the user interface experience.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable communication device, comprising:
    a land mobile radio (LMR) power supply;
    an applications system power supply;
    a power arbitration module formed with hardware logic configured to:
        detect attachment of a battery to the portable communication device;
        determine whether the battery is one of:
            an intrinsically safe (IS) battery;
            a standard, non-intrinsically safe (non-IS) battery;
        enable a converged platform mode of operation in response to determining that the battery is a standard, non-intrinsically safe battery;
        enable both the applications system power supply and the LMR power supply for the converged platform mode of operation;
        enable a land mobile radio (LMR) mode of operation in response to determining that the battery is an intrinsically safe battery;
        enable the LMR power supply and not enable the applications system power supply during the LMR mode of operation; and
    discharge circuitry that discharges residual power at the applications system power supply in response to an IS battery being attached to the portable communication device.

2. The portable communication device of claim 1, wherein detection of battery attachment and determination of the battery is without a software protocol.

3. The portable communication device of claim 1, wherein the hardware logic of the power arbitration module comprises a state machine.

4. The portable communication device of claim 1, wherein
    the land mobile radio (LMR) power supply powers an LMR modem;
    the applications system power supply powers a plurality of auxiliary functions; and
    wherein the hardware logic of the power arbitration module comprises a state machine of pre-programmed hardware logic.

5. The portable communication device of claim 1, further comprising:
    a first display and a second display, the first display being a touch screen display for application processes, the second display for displaying LMR information; and
    wherein both the first and second displays are operational during the converged platform mode of operation, and only the second display for displaying LMR information is operational during the LMR mode of operation.

6. The portable communication device of claim 1, wherein the converged platform mode of operation is provided by a land mobile radio modem and at least one of: a long term evolution (LTE) modem, BLUETOOTH modem, wireless local area network (WLAN) modem, and near field communications (NFC) modem, a touch screen display.

7. The portable communication device of claim 1, wherein the portable communication device is a public safety communication device.

8. A portable radio communication system, comprising:
    a radio housing that interchangeably accepts an intrinsically safe battery and a standard non-intrinsically safe battery; and
    hardware logic within the radio housing that detects attachment of a battery and provides power arbitration for:

a standard, non-intrinsically safe mode of operation based on attachment of the standard, non-intrinsically safe (non-IS) battery;

an intrinsically safe (IS) mode of operation based on attachment of the intrinsically safe battery, and wherein:

in the standard, non-intrinsically safe mode of operation both a land mobile radio (LMR) system and non-mission critical auxiliary application (AP) system are powered by the standard, non-intrinsically safe battery; and in the intrinsically safe mode of operation the AP system is unpowered and remains unpowered until the intrinsically safe battery is removed and a standard, non-intrinsically safe battery is attached.

9. The portable radio communication system of claim 8, wherein the non-mission critical auxiliary application (AP) system comprises at least one of the following functions: a long term evolution (LTE), BLUETOOTH, wireless local area network (WLAN), and near field communications (NFC), and a touch screen display.

10. The portable radio communication system of claim 8, further comprising:

a first display and a second display, the first display being a touch screen display for application processes, the second display for displaying LMR information; and wherein both the first and second displays are operational during the non-IS mode of operation, and only the second display for displaying LMR information is operational during the IS mode of operation.

11. A method of operating a portable communication device, comprising:

detecting, using hardware logic at the portable communication device, attachment of a battery to the portable communication device;

determining, using the hardware logic, whether the attached battery is a standard, non-intrinsically safe battery or an intrinsically safe battery;

enabling, using the hardware logic, power for operating the portable communication device in a standard, non-intrinsically safe mode of operation based on attachment of the standard non-intrinsically safe battery wherein enabling power in the standard, non-intrinsically safe mode further comprises enabling an auxiliary applications power supply and a land mobile radio (LMR) power supply; and enabling, using the hardware logic, power for operating the portable communication device in an intrinsically safe mode of operation based on attachment of the intrinsically safe battery wherein enabling power in the intrinsically safe mode further comprises enabling a land mobile radio (LMR) power supply and discharging any residual power on the auxiliary applications power supply.

12. The method of claim 11, further comprising:

enabling both a first touch screen display and a second non-touch screen display of the portable communication device during standard, non-intrinsically safe mode of operation; and enabling only the second, non-touch screen display during the intrinsically safe mode of operation.

13. The method of claim 11, wherein enabling power for operating the portable communication device in a standard, non-intrinsically safe mode further enables converged LMR and non-LMR auxiliary platforms.

14. The method of claim 13, wherein and enabling power for operating the portable communication device in an intrinsically safe mode enables operation of the portable communication device using only an LMR platform.

15. The method of claim 13, wherein the non-LMR auxiliary platform comprises at least one of: a long term evolution (LTE), BLUETOOTH, a wireless local area network (WLAN), near field communications (NFC), and a touch screen display.

16. A portable communication device, comprising:

a power arbitration module formed with hardware logic configured to:

detect attachment of a battery to the portable communication device;

determine whether the battery is one of:
an intrinsically safe (IS) battery;
a standard, non-intrinsically safe (non-IS) battery;

enable a converged platform mode of operation in response to determining that the battery is a standard, non-intrinsically safe battery;

enable a land mobile radio (LMR) mode of operation in response to determining that the battery is an intrinsically safe battery;

a first display and a second display, the first display being a touch screen display for application processes, the second display for displaying LMR information; and wherein both the first and second displays are operational during the converged platform mode of operation, and only the second display for displaying LMR information is operational during the LMR mode of operation.

17. A portable radio communication system, comprising:

a radio housing that interchangeably accepts an intrinsically safe battery and a standard non-intrinsically safe battery; and hardware logic within the radio housing that detects attachment of a battery and provides power arbitration for:

a standard, non-intrinsically safe mode of operation based on attachment of the standard, non-intrinsically safe (non-IS) battery; and an intrinsically safe (IS) mode of operation based on attachment of the intrinsically safe battery;

a first display and a second display, the first display being a touch screen display for application processes, the second display for displaying LMR information; and wherein both the first and second displays are operational during the non-IS mode of operation, and only the second display is operational during the IS mode of operation.

18. A method of operating a portable communication device, comprising:

detecting, using hardware logic at the portable communication device, attachment of a battery to the portable communication device;

determining, using the hardware logic, whether the attached battery is a standard, non-intrinsically safe battery or an intrinsically safe battery;

enabling, using the hardware logic, power for operating the portable communication device in a standard, non-intrinsically safe mode of operation based on attachment of the standard non-intrinsically safe battery;

enabling, using the hardware logic, power for operating the portable communication device in an intrinsically safe mode of operation based on attachment of the intrinsically safe battery enabling both a first touch screen display and a second non-touch screen display of the portable communication device during standard, non-intrinsically safe mode of operation; and enabling only the second, non-touch screen display during the intrinsically safe mode of operation.

* * * * *